(12) United States Patent
D'Arco

(10) Patent No.: US 8,833,748 B2
(45) Date of Patent: Sep. 16, 2014

(54) PIPE HOLDING DEVICE AND METHOD OF PERFORMING ELECTROFUSION WITH A SINGLE OPERATOR

(75) Inventor: Joseph D'Arco, Plainview, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 274 days.

(21) Appl. No.: 13/534,227

(22) Filed: Jun. 27, 2012

(65) Prior Publication Data

US 2013/0000834 A1    Jan. 3, 2013

Related U.S. Application Data

(60) Provisional application No. 61/502,482, filed on Jun. 29, 2011.

(51) Int. Cl.
| | |
|---|---|
| *B25B 5/00* | (2006.01) |
| *B25B 5/10* | (2006.01) |
| *B29C 65/34* | (2006.01) |
| *B29C 65/78* | (2006.01) |
| *B25B 5/14* | (2006.01) |
| *B29C 65/00* | (2006.01) |

(52) U.S. Cl.
CPC ............... *B29C 65/7841* (2013.01); *B25B 5/10* (2013.01); *B29C 65/3468* (2013.01); *B25B 5/006* (2013.01); *B29C 66/71* (2013.01); *B25B 5/147* (2013.01); *B29C 65/342* (2013.01); *B29C 66/522* (2013.01); *B29C 66/5229* (2013.01)

USPC .......................................... 269/143; 269/249

(58) Field of Classification Search
CPC .......... B25B 3/00; B25B 5/067; B25B 5/002; B60D 1/00; B60D 1/06; B60D 1/246; B60D 1/1363
USPC ........... 269/143, 249, 95, 71, 6, 3; 280/415.1, 280/769
See application file for complete search history.

(56) References Cited

U.S. PATENT DOCUMENTS

| | | | | |
|---|---|---|---|---|
| 6,109,601 | A * | 8/2000 | St. John, Sr. | 269/71 |
| 8,047,516 | B2 * | 11/2011 | Livingston et al. | 269/249 |
| 2007/0290480 | A1 * | 12/2007 | Wolter | 280/415.1 |
| 2008/0231029 | A1 * | 9/2008 | Hummel | 280/769 |
| 2013/0000834 | A1 * | 1/2013 | D'Arco | 156/272.2 |

* cited by examiner

*Primary Examiner* — Lee D Wilson
(74) *Attorney, Agent, or Firm* — Cantor Colburn LLP

(57) ABSTRACT

A device comprising: a first tube, the first tube configured to couple to a work surface; a second tube coupled to an end of the first tube and arranged substantially perpendicular to the first tube; a lower jaw coupled to the second tube, the lower jaw having a first semi-cylindrical surface opposite the second tube; a jaw adapter coupled to the semi-cylindrical surface; an upper jaw rotatably couple to the lower jaw, the upper jaw having a second semi-cylindrical surface disposed opposite the first semi-cylindrical surface; and, a coupling assembly arranged to couple the upper jaw to the lower jaw, the coupling assembly being disposed on one end of the upper jaw and lower jaw.

12 Claims, 8 Drawing Sheets

SECTION A-A

SECTION B-B

DETAIL A

PIPE HOLDING DEVICE AND METHOD OF PERFORMING ELECTROFUSION WITH A SINGLE OPERATOR

CROSS REFERENCE TO RELATED APPLICATIONS

The present application claims priority to U.S. Provisional Application Ser. No. 61/502,482 filed on Jun. 29, 2011 the contents of which is incorporated herein by reference in its entirety.

BACKGROUND OF THE INVENTION

The subject matter disclosed herein relates to a device for securing a conduit or pipe, and in particular to a device to secure the pipe to a workbench Pipes used in some applications, such as gas pipelines for example, are fused together with a process known as electro fusion. In the electro fusion process a heating wire is permanently molded into the fitting. The wire gets heated by current at a low voltage. The material surrounding the wire melts and expands due to the increase in temperature. The melting of the plastic material closes the gap between pipe and fitting, leading to a heat transition to the pipe which also gets heated and melts in the welding zone. The pipe material also expands during the process.

To ensure an proper welding of the materials, the pipe needs to be properly prepared, such as by shaving the outer surface. Typically this process requires two people, one person to hold and secure the pipe on the ground, while the second person performs the prepping process. It should be appreciated that this process does not have desired ergonomics. Further, the process is labor intensive which increases costs.

Accordingly, while existing gas pipe preparation techniques are suitable for their intended purposes a need for improvement remains, particularly in providing a device to assist in the preparation process.

According to one aspect of the invention a device for holding a pipe is provided. The device comprising: a first tube, the first tube configured to couple to a work surface; a second tube coupled to an end of the first tube and arranged substantially perpendicular to the first tube; a lower jaw coupled to the second tube, the lower jaw having a first semi-cylindrical surface opposite the second tube; a jaw adapter coupled to the semi-cylindrical surface; an upper jaw rotatably couple to the lower jaw, the upper jaw having a second semi-cylindrical surface disposed opposite the first semi-cylindrical surface; and, a coupling assembly arranged to couple the upper jaw to the lower jaw, the coupling assembly being disposed on one end of the upper jaw and lower jaw.

According to another aspect of the invention, a method of electrofusing a pipe by a single person is provided. The method includes providing a vice having a first tube coupled to a second tube, the second tube being substantially perpendicular to the first tube. The vice further includes a lower jaw coupled to the second tube, an upper jaw is rotationally coupled to the lower jaw and movable between an open position and a closed position. A coupling assembly is configured to couple the upper jaw to the lower jaw when in the closed position. The upper jaw is moved to the open position. A pipe is inserted onto the lower jaw. The upper jaw is moved to the closed position. The upper jaw is coupled to the lower jaw in the closed position. Electro fusion operation is performed on the pipe. The pipe is released from the vice.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
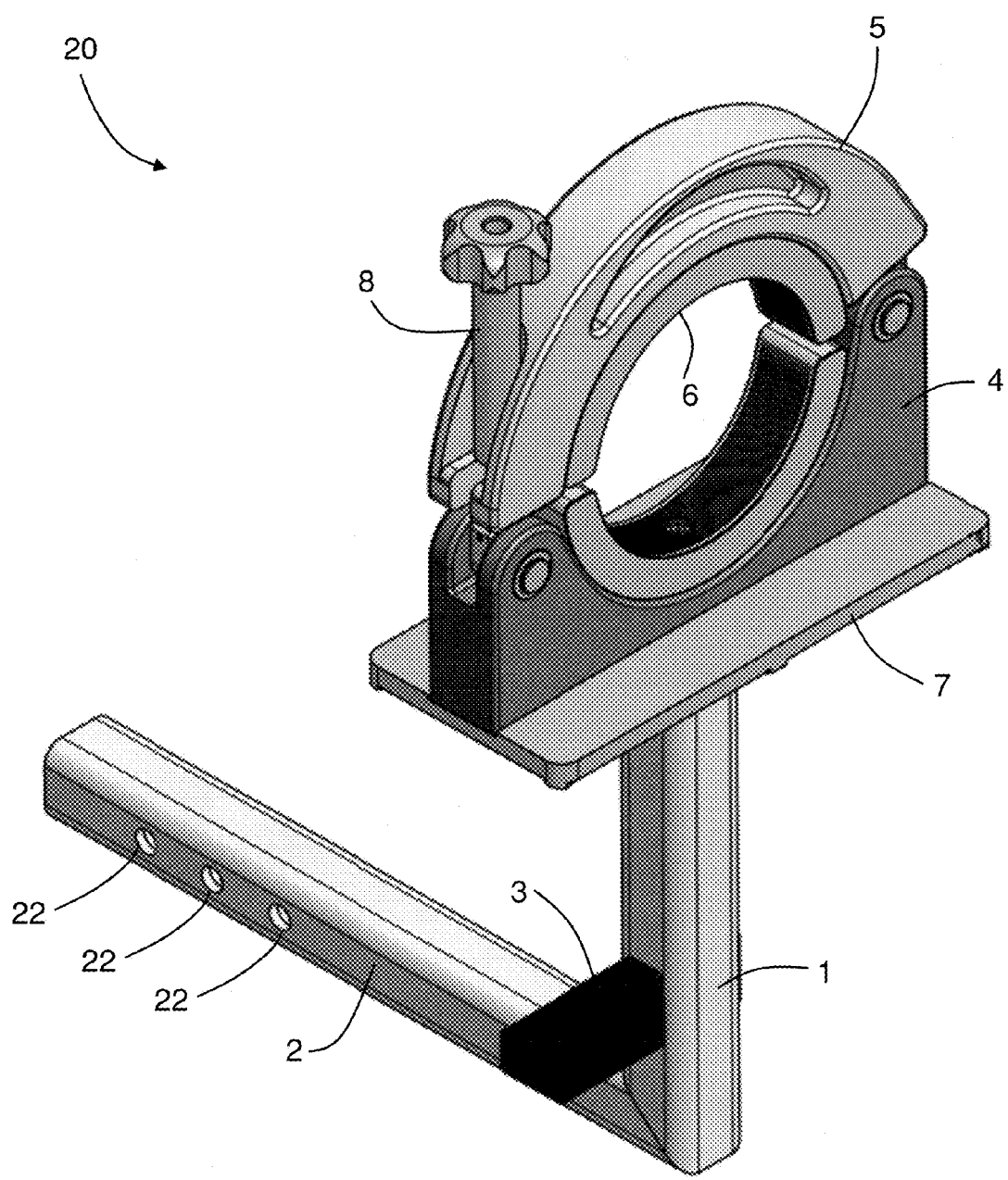
FIG. 1 is a perspective view of a vice for a pipe in accordance with an embodiment of the invention.

The detailed description explains embodiments of the invention, together with advantages and features, by way of example with reference to the drawings.

DETAILED DESCRIPTION OF THE INVENTION

Referring to FIGS. 1-7, a vice device 20 for use with preparing pipes for welding, such as through an electro fusion process for example, is shown. Electrofusion is a method of joining plastic pipes, such as medium density polyethylene or high density polyethylene for example, with special fittings that have built-in electric heating elements which are used to weld the joint together. The device 20 includes a horizontal tube 2 that includes a plurality of holes 22. The holes 22 are sized and spaced to accept a fastener (not shown) that couples the device 20 to a workbench, or to a service vehicle (e.g. a truck bed). Extending from the horizontal tube 2 is a vertical tube 1. The tubes 1, 2 may be coupled by any suitable means, such as welding for example. A gusset 3 may be joined between the tubes 1, 2 to further strengthen the connection.

Figure 2:
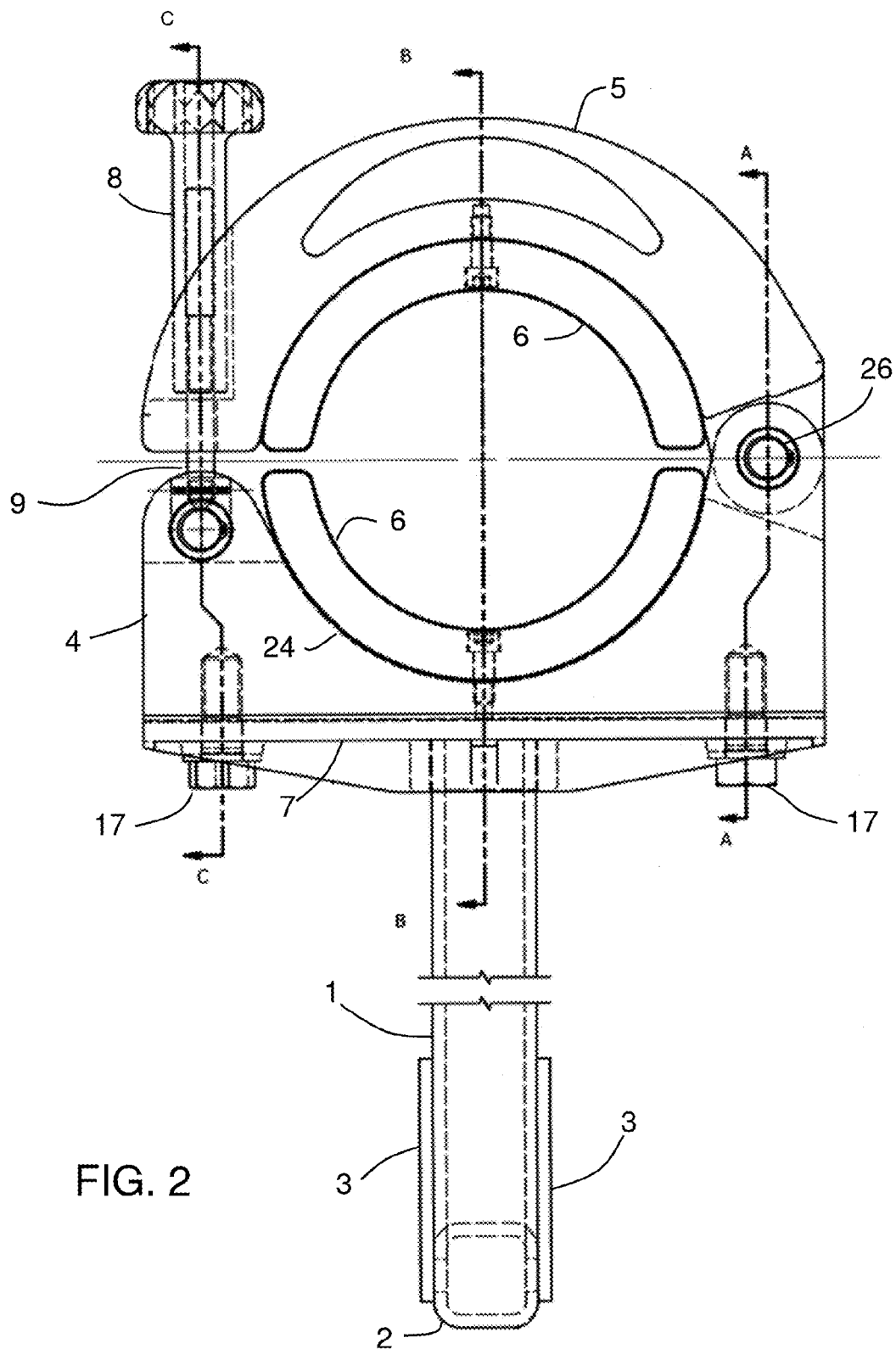
FIG. 2 is a front view of the vice of FIG. 1.
Figure 3:
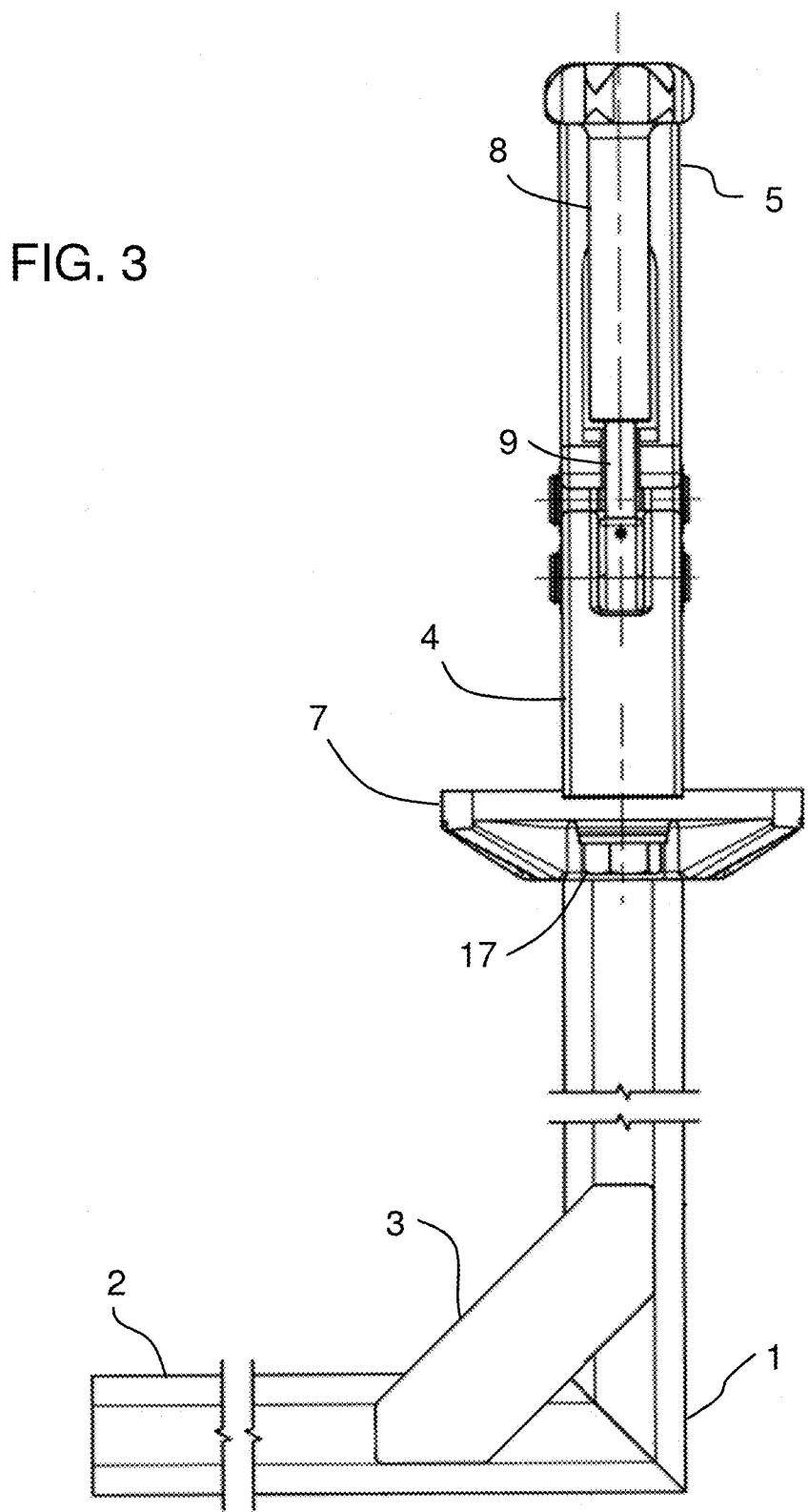
FIG. 3 is a side view of the vice of FIG. 1.
Figure 4:
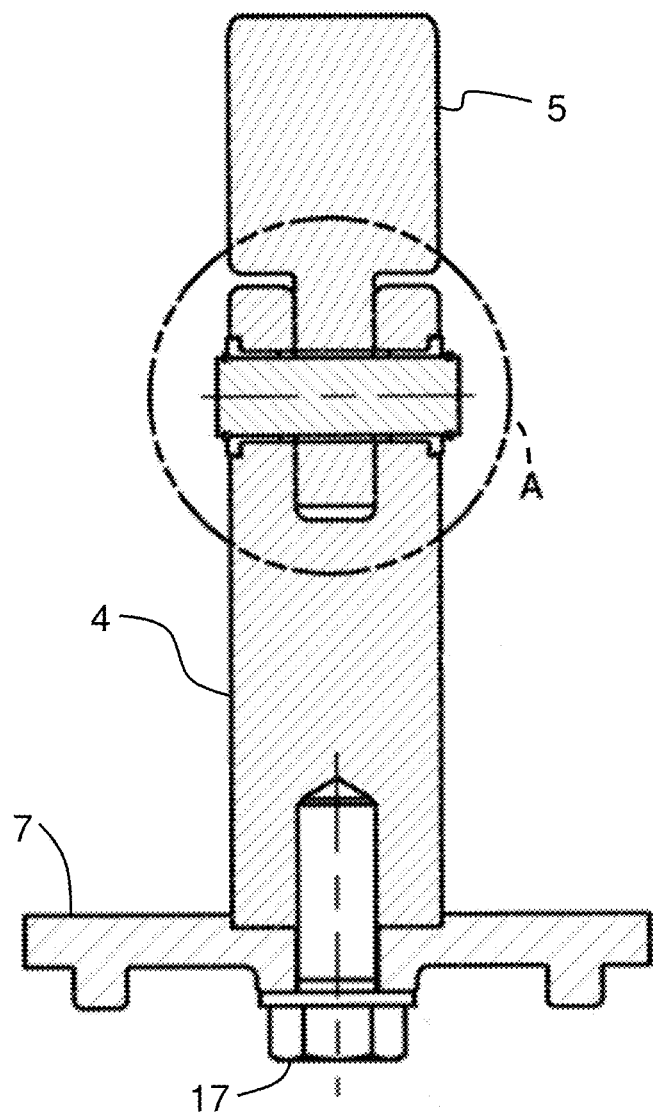
FIG. 4 is a sectional view of the vice of FIG. 1 along the section line A-A.
Figure 5:
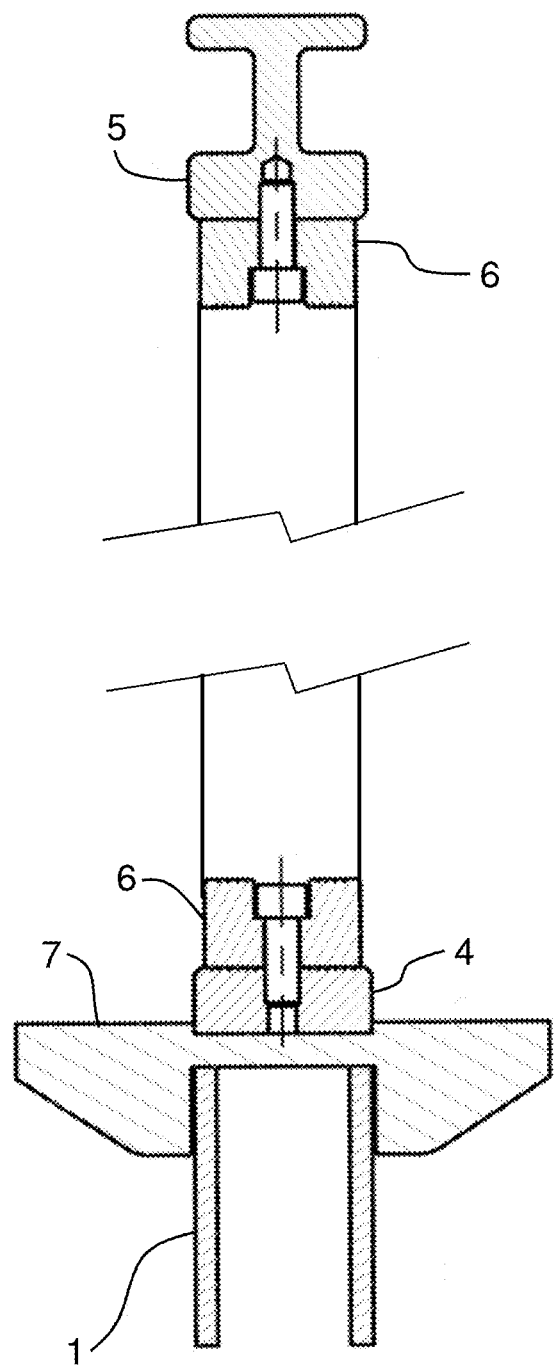
FIG. 5 is a partial sectional view of the vice of FIG. 1 along the section line B-B.
Figure 6:
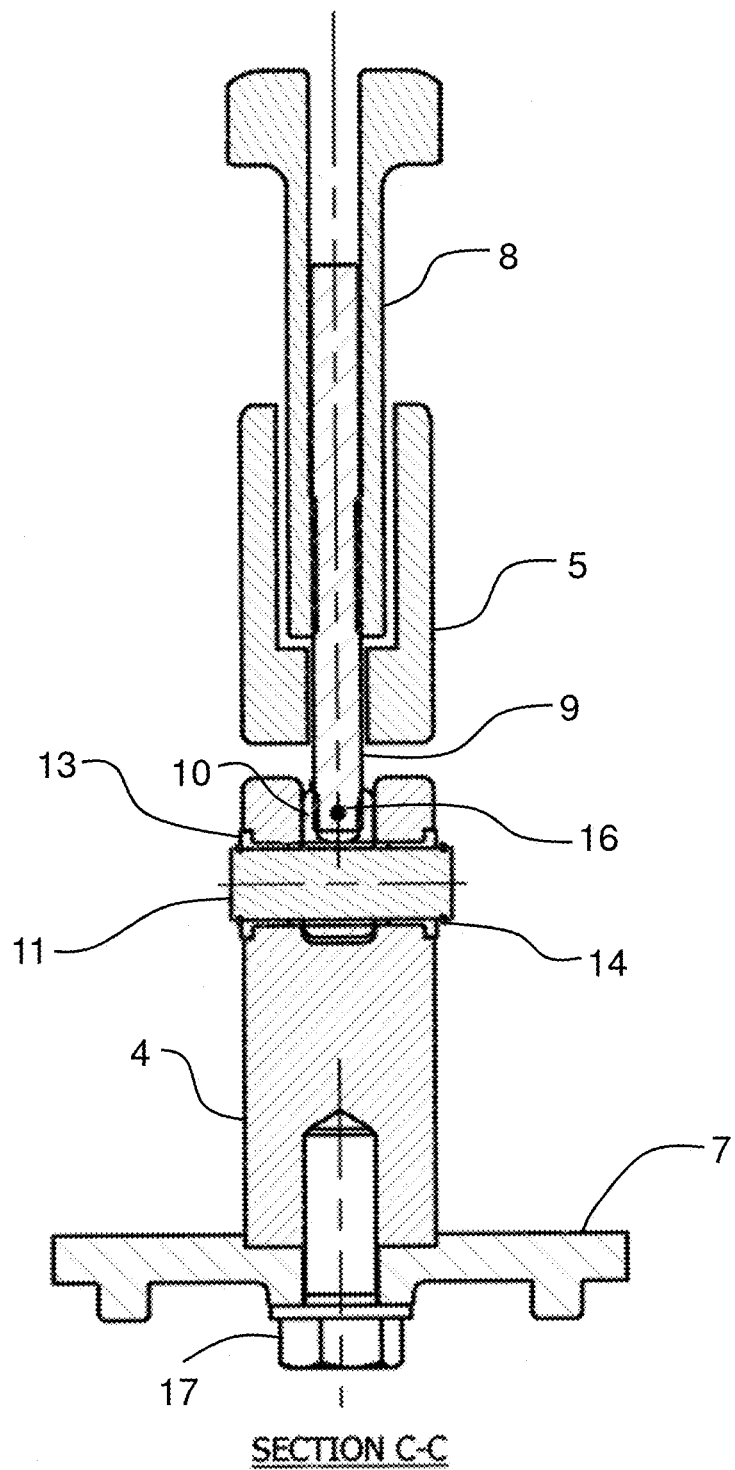
FIG. 6 is a sectional view of the vice of FIG. 1 along the section line C-C.

Arranged on one end of the tube 1 is a support plate 7. Extending from the support plate 7 is a lower jaw 4. The jaw 4 may be connected to the plate 7 by any suitable means, such as bolts 17 (FIG. 2, 4). The lower jaw 4 includes a semi-circular surface 24 opposite the plate 7. Coupled to the surface 24 is a jaw adapter 6 made from 6061 aluminum alloy.

Arranged at one end of the lower jaw 4 is a hinge 26. The hinge 26 couples the lower jaw 4 to an upper jaw 5. The upper jaw 5 has a semi-circular surface 28 arranged opposite the surface 24. Coupled to the surface 28 is a second jaw adapter 6. The two jaw adapters 6 cooperate to define an opening sized to securely hold a pipe when the jaws 4, 5 are in a closed position.

Figure 7:
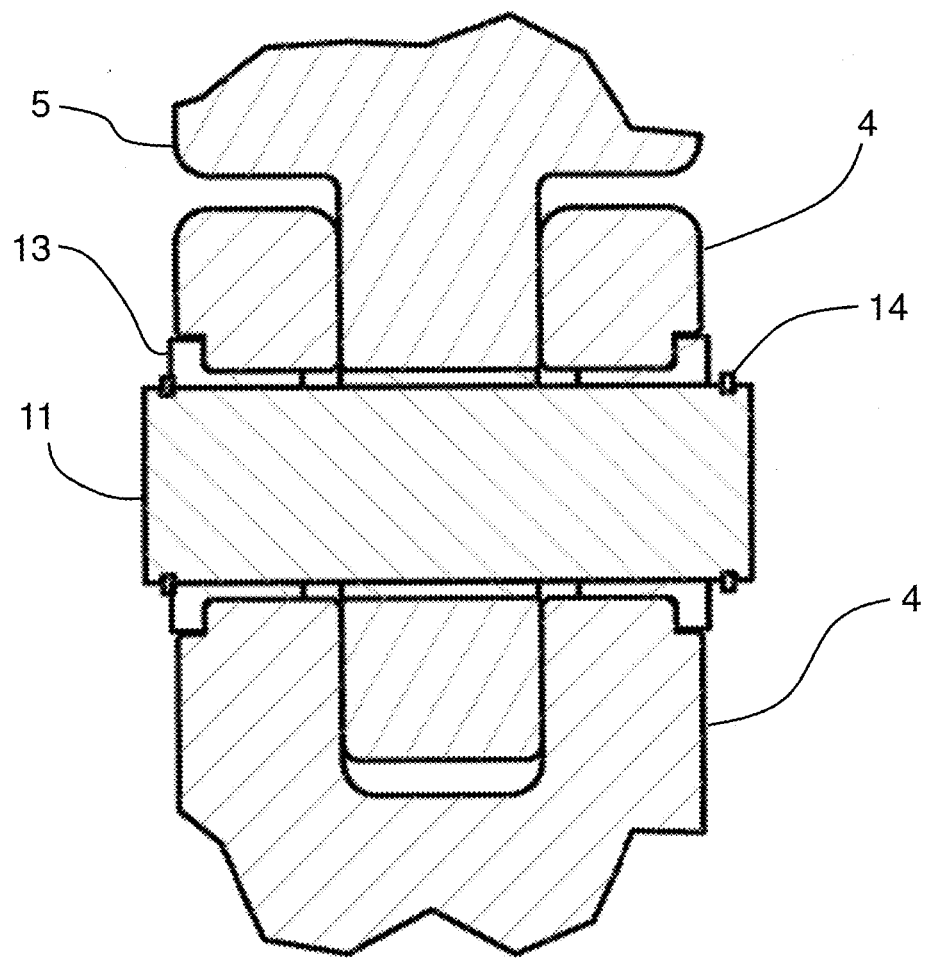
FIG. 7 is an enlarged portion of the sectional view of FIG. 4.
Figure 8:
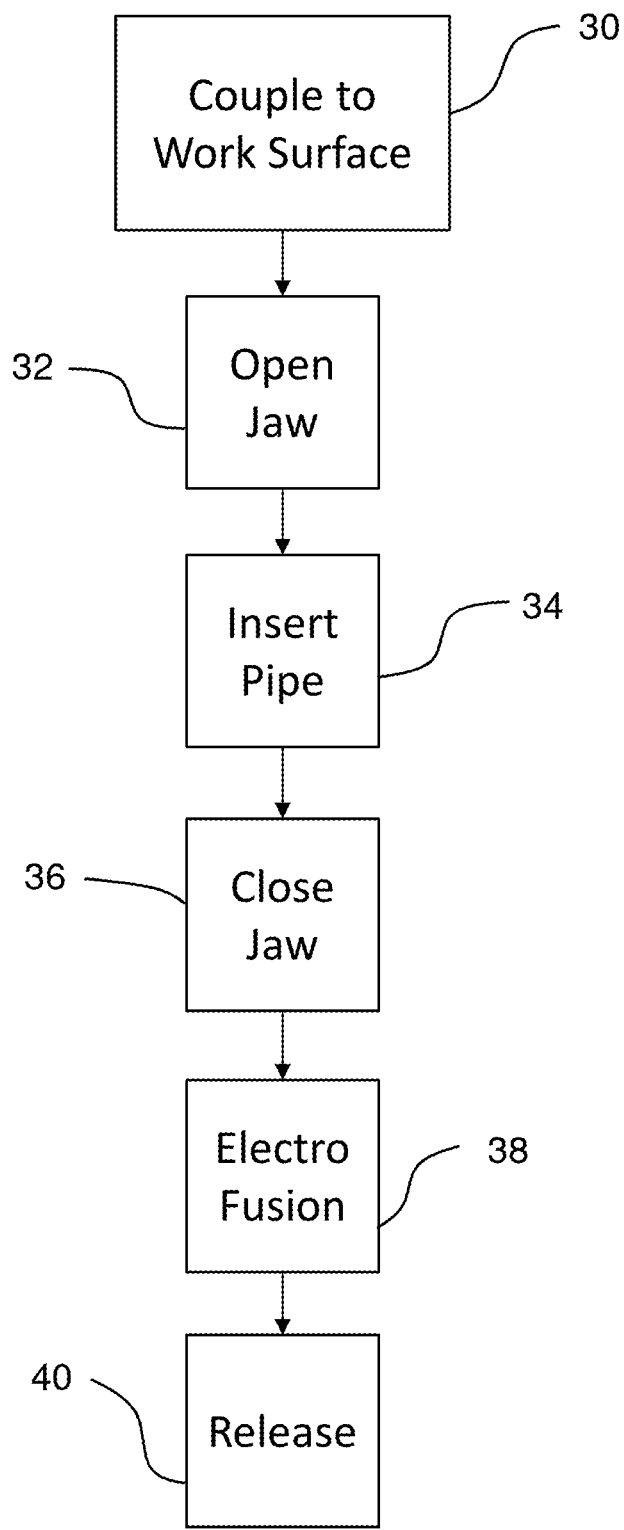
FIG. 8 is a flow chart of a method of processing a pipe.

Opposite the hinge 26 is a coupling assembly 30 (FIG. 7). The coupling assembly 30 includes a fastener, such as hexagon cap screw 8. The screw 8 has an inner bore that receives a handle stud 9. The screw 8 and stud 9 extend through a hole in the upper jaw 5. A slotted spring pin 16 is inserted into the stud 9 to retain the stud on the upper jaw 5.

The stud 9 engages a handle nut 10 that is coupled to the lower jaw 4. The handle nut 10 is coupled to the lower jaw 4 by a jaw shaft 11. A sleeve bushing 13 is disposed about the jaw shaft 11 to allow the handle nut 10 to rotate to accommodate the arc of the upper jaw 5 and allow the nut 10 to align with the stud 9. A retaining ring, such as snap washer 14 retains the jaw shaft 11 on an end of the lower jaw 4.

In operation, the service personnel couple 30 the device 20 to a work surface, such as a work bench or a vehicle for example. The upper jaw 5 is rotated to open 32 the device 20 and prepare it to receive the pipe, such as an 8" pipe for example. Once the pipe is in position 34, the upper jaw 5 is rotated closed 36 and the cap screw 8 is rotated to engage the stud 9 in the nut 10. The coupling assembly 30 is tightened to securely hold the pipe in place while preparation steps are taken. The pipes to be joined are then cleaned and inserted into the electrofusion fitting. A voltage (typically 40V) is applied 38 for a fixed time depending on the fitting in use, the built in heater coils then melt the inside of the fitting and the outside of the pipe wall which weld together producing a very strong homogeneous joint. The assembly is then left to cool for a specified time. To release 40 the pipe, the service personnel loosen the coupling assembly 30 and rotate the upper jaw 5 to an open position. It should be appreciated that the device 20 allows the preparation process to be completed by a single operator.

Embodiments of the present invention provide advantages for a vice that securely holding a pipe during a processing step to allow the processing to be completed by a single operator. Still further embodiments of the present invention allow for a vice that may be quickly and easily attached to a variety of work surfaces either in a fixed facility or in the field.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device comprising:
    a first tube, the first tube configured to couple to a work surface;
    a second tube coupled to an end of the first tube and arranged substantially perpendicular to the first tube;
    a lower jaw coupled to the second tube, the lower jaw having a first semi-cylindrical surface opposite the second tube;
    a jaw adapter coupled to the semi-cylindrical surface;
    an upper jaw rotatably couple to the lower jaw, the upper jaw having a second semi-cylindrical surface disposed opposite the first semi-cylindrical surface; and,
    a coupling assembly configured to couple the upper jaw to the lower jaw, the coupling assembly being disposed on one end of the upper jaw and lower jaw.

2. The device of claim 1 wherein the upper jaw is movable between an open position and a closed position.

3. The device of claim 2 wherein the upper jaw and the lower jaw cooperate to define an opening in the closed position, the opening sized to receive an eight inch pipe.

4. The device of claim 3 wherein the coupling assembly includes a fastener rotationally coupled to the upper jaw, the fastener having a handle portion with a hole extending therethrough, the fastener further having a stud member coupled to the handle portion and extending through the hole.

5. The device of claim 4 wherein the coupling assembly further includes a handle nut coupled to the lower jaw, the handle nut being sized and positioned to receive the stud member when the upper jaw is in the closed position.

6. The device of claim 5 wherein the fastener is coupled to the upper jaw by a spring pin coupled to the stud member.

7. The device of claim 6 further comprising a shaft coupled to an end of the lower jaw adjacent the coupling assembly.

8. The device of claim 7 further comprising a sleeve bushing coupled disposed about the shaft, the sleeve bushing being configured to align the handle nut with the jaw.

9. A method of electrofusing a pipe by a single person, the method comprising:
    providing a vice having a first tube coupled to a second tube, the second tube being substantially perpendicular to the first tube, the vice further having a lower jaw coupled to the second tube, an upper jaw is rotationally coupled to the lower jaw and movable between an open position and a closed position, a coupling assembly is configured to couple the upper jaw to the lower jaw when in the closed position;
    move the upper jaw to the open position;
    insert a pipe onto the lower jaw;
    move the upper jaw to the closed position;
    couple the upper jaw to the lower jaw in the closed position;
    perform an electro fusion operation on the pipe;
    release the pipe from the vice.

10. The method of claim 9 wherein the step of electrofusion includes the step of coupling a fitting to the pipe.

11. The method of claim 10 wherein the step of electrofusion includes the step of applying a voltage to a fitting for a predetermined amount of time.

12. The method of claim 10 wherein the step of electrofusion further includes the step of cooling the pipe for a predetermined amount of time.

* * * * *